United States Patent [19]

Larrson et al.

[11] 4,315,761

[45] Feb. 16, 1982

[54] METHOD FOR BINDING AND CLEARING ANIMAL WASTE PRODUCTS

[76] Inventors: Karl I. Larrson, Hevigsgatan 6, 702 25 Orebro; Per A. H. Jakobsson, Blombergsvagen 24M, 720 30 Orebro, both of Sweden

[21] Appl. No.: 76,566

[22] Filed: Nov. 15, 1979

[30] Foreign Application Priority Data

Oct. 10, 1978 [SE] Sweden ............................. 7810566

[51] Int. Cl.³ .............................................. C05F 3/00
[52] U.S. Cl. ............................................. 71/21; 71/3; 71/900; 119/1; 422/5
[58] Field of Search ........................... 71/21, 3, 4, 900; 119/1; 422/5; 210/751, 916; 4/111.1, DIG. 12

[56] References Cited

U.S. PATENT DOCUMENTS

| | | | |
|---|---|---|---|
| 70,671 | 11/1867 | Zeng ..................................... | 71/21 |
| 2,895,873 | 7/1959 | Sawyer ................................. | 119/1 |
| 3,231,324 | 1/1966 | Young ................................. | 210/916 |
| 3,286,691 | 11/1966 | McFadden ............................ | 119/1 |
| 4,113,504 | 9/1978 | Chen et al. .......................... | 210/751 |

FOREIGN PATENT DOCUMENTS

| | | | |
|---|---|---|---|
| 52-46662 | 4/1977 | Japan ................................... | 210/251 |
| 2883 | of 1868 | United Kingdom ..................... | 71/3 |
| 1675 | of 1893 | United Kingdom ..................... | 71/12 |
| 824844 | 12/1959 | United Kingdom ..................... | 71/3 |

*Primary Examiner*—Kenneth M. Schor
*Attorney, Agent, or Firm*—Larson and Taylor

[57] ABSTRACT

The object of the invention is to use a finely divided calcium hydrosilicate material, in particular aerated or foamed concrete, as a substance for binding and clearing of urine and excrements of the kind excreted for instance by our pet animals. This material gives rapid and effective drying of the excrements, which, particularly if the material is combined with gypsum as a bond-improving agent, become extremely easy to remove or clear.

2 Claims, No Drawings

METHOD FOR BINDING AND CLEARING ANIMAL WASTE PRODUCTS

Animal slag products in the form of excrement and urine which are excreted in a natural biological manner by pet animals kept by people have come to constitute a growing problem in our densely built-up areas. This applies regardless of whether the animals are exercised out of doors or if they are permitted to relieve themselves indoors. When the pet animals are exercised out of doors, the vast majority in this case being dogs, the owners surprisingly frequently quite simply allows the animal's excrement to remain where it drops, e.g. in parks, on paths, in sandboxes, on streets, etc., where it often constitutes a serious sanitary inconvenience. As a rule, only small animals such as cats, guinea pigs, rabits, hamsters, mice, etc. are allowed to relieve themselves indoors. This is best done in special trays in which a bed of a substance is spread out in which at least the urine is absorbed, said substance being replaced at suitable intervals. Substances already known for use as urine-absorbants are sand or, in more sophisticated connections, porous granulates of burnt expanded clay. The clearing effect of these previously known substances, is, however, rather mediocre and in practice it consists in all essentials simply in the urine-absorbing effect alone.

The object of the present invention is to provide a clearing substance with considerably better properties than those of previously known agents, particularly with regard to the ability of the substance to bind and neutralize excrement. According to the invention, this is achieved by the use of a substance consisting of or comprising a finely-divided calcium hydrosilicate material. Common to all types of calcium hydrosilicate materials is that they are produced while using a water surplus which, upon curing of the material, gives rise to micropores in the material, something which in turn imparts to the material a large specific surface (in the order of a tenth or a few tenths of a square meter per gramme). In addition, the material usually has a relatively high alkalinity which makes the material more or less bactericidal, a property which is highly desirable in connection with binding of animal slag products of the kind concerned. Another important advantage of the substance according to the invention is that the same, owing to its large specific surface, absorbs the odour of the slag products concerned.

In practice, the substance according to the invention may advantageously consist of crushed and/or ground aerated concrete. Conventional aerated concrete chemically consists of calcium hydrosilicate which has been made macro-porous by means of a suitable gas-forming agent. As a rule, the aerated concrete is made from a basic mixture containing sand (giving white aerated concrete) or shale ash (giving blue-gray aerated concrete) as a $SiO_2$-containing material as well as lime and/or cement as a hydraulic binding agent, both water and aluminum powder as a gas-forming agent then being added to the basic mixture. After riding due to the development of gas the aerated concrete is divided and shaped in the desired manner, whereafter it is steam-hardened at elevated pressure and elevated temperature. Produced by this means is a macroporous as well as micro-porous inorganic product having a volumetric weight usually amounting to 0.4–0.65 kg/cm3.

Below follows an example of the composition of a type of aerated concrete suitable for the application according to this invention. In practice, this aerated concrete is manufactured under the designation of white YTONG®, a trademark of Ytong International AB. The composition is represented by a silicate analysis in accordance with the left-hand table and a trace element analysis according to the right-hand table.

| Component No. | Chemical designation and content of included components | | Trace elements | mg/kg |
|---|---|---|---|---|
| | | % by weight | | |
| 1 | $SiO_2$ (mainly bound) | 60 | Silver, Ag | <1 |
| | | | Arsenic, As | <50 |
| | | | Beryllium, Be | <3 |
| 2 | CaO (small amounts of water-soluble substances in the form of $Na_2SO_4$) | 30 | Bismuth, Bi | <10 |
| | | | Cadmium, Cd | <10 |
| | | | Cobolt, Co | <10 |
| | | 0.5 | Chromium, Cr | ≦50 |
| 3 | $Al_2O_3$ | 2 | Copper, Cu | <10 |
| 4 | $Fe_2O_3$ | 1 | Manganese, Mn | ~200 |
| 5 | MgO | 0.5 | Molybdenum, Mo | <10 |
| 6 | $CO_2$ | 2 | Nickel, Ni | <10 |
| 7 | Water soluble ($CaSO_4$) | | Lead, Pb | <10 |
| The above oxides are chemically bound to each other thereby forming various types of hydrosilicates. e.g. $CaO-SiO_2, H_2O$. The content of free $SiO_2$ is so low that no risk of silicosis exists. | | | Antimony, Sb | <100 |
| | | | Tin, Sn | <10 |
| | | | Vanadium, V | ~10 |
| | | | Zinc, Zn | ~100 |

The above material has a specific surface of 23 m2/g. Analagous grains prepared from aerated concrete designated blue YTONG® "144" and blue YTONG® "195" have a specific surface of 42 and 38 m2/g respectively. These high values of the specific surface is due to the fact that the aerated concrete, in addition to the macropores obtained through the gas-forming agent, also contain micropores which, as indicated above, originate from the circumstance that the calcium silicate hydrates in question have been formed while using surplus water.

Naturally, foamed concrete may be used instead of aerated concrete in accordance to the invention. The main difference between aerated concrete and foamed concrete is in point of fact only that instead of a gas-forming agent as used for aerated concrete, a foaming agent is used to form the macropores in foamed concrete.

It is also conceivable to use a modified type of such light-weight concrete materials, namely a material produced in substantially the same manner as indicated above, except that the steam-hardening procedure is excluded. This results in a material which is considerably less resistant than the conventional aerated or foamed concrete and which is therefore more easily finely divided. Likewise, the raising or gasification of the concrete-forming mixture may be dispensed with, whereupon the formation of macropores in the material does not occur. This may naturally be done regardless of whether or not steam hardening occurs.

When the substance is used outdoors, the grain size may be as small as 0.1 mm or even 0.01 mm. As an upper limit of the grain size 10 mm is preferred. Grains larger than 10 mm are not desirable as they are probably regarded by the animals as being rather large and clumsy.

When the substance is used indoors, the grain size should not be smaller than 0.5 mm, since if smaller constituents than 0.5 mm occur in the substance, these will adhere to the paws of the animals and give more or less distinctive tracks, which are left on carpets, floors, furniture and so on.

Ideally, the grain size of the substance is between 0.5 and 5 mm. Such a substance has, on the one hand, no track-depositing fine constituents and, on the other hand, no large grains which would irritate at least the small pet animals.

The liquid-absorbing capacity of the aerated or foamed concrete material varies with the normally occurring humidity of the material but amounts on average to 300–400 ml of liquid per liter of absorbent material at a humidity of 7–10 percent by weight. This material will not only rapidly absorb any urine, but it will also, upon contact with excrement, absorb a certain portion of the excremental liquid content and thus adhere to the excrement while encapsulating and binding it. To put it briefly: the excrement is dried out and becomes easy to remove.

In accordance with a preferred embodiment of the invention, the binding capacity of the substance may be improved by addition of a certain quantity of gypsum or flower of gypsum ($CaSO_4, \frac{1}{2} H_2O$). Thus experiments have shown that 9 parts by weight of finely crushed aerated concrete (0.5–5 mm) mixed intimately with 1 part by weight of flower of gypsum give a substance which, upon contact with both urine and exrement, rapidly forms dry solid lumps with good retentive capacity which can easily be cleared from the relieving point concerned.

The substance may of course contain both larger and smaller quantities of gypsum. The amount of added gypsum should nevertheless be within the range of 5–15% by weight and preferably 8–12% by weight.

The practical use of the substance according to the invention may be materialized in different ways. Indoors, the substance is appropriately used in conventional trays. Outdoors, the substance may similarly be used in trays although in such cases these are greater and appropriately arranged under a roof by one means or another. Such trays may advantageously be put out and taken care of under the auspices of the local authorities, in which case the trays containing the substance according to the invention are very easy to clear, since the dried lumps formed jointly by the substance and the slag products may very easily be removed and replaced by fresh substance at appropriate intervals. During the time these dried lumps remain in the trays between the clearing occasions, the lumps are comparatively hygienic on account of the high pH-value of the material and do not cause any sanitary inconveniences. A further advantage of the material is that in consequence of its high pH-value, it is corrosion-inhibiting and may thus be safely stored in simple and inexpensive sheet-metal containers.

When the substance according to the invention has been used for its intended purpose and thus been fouled with urine and/or excrement, it is ideal for use as a soil improver, which can be spread directly on the ground in a suitable manner. As a soil improver, the material gives a good long-time effect due to its macroporous as well as microporous structure.

It is obvious that the inventive concept is not confined strictly to the above described examples. Thus it is conceivable to mix into the substance other materials than gypsum as a bond-improving agent. For example glue substances may be added. It is also feasible to add some kind of substance with a pleasing odour, either in powder or in liquid form.

What is claimed is:

1. In the treatment of animal excrement and urine with an animal litter in an amount sufficient to bind and clear said excrement and urine, the improvement which comprises using as said animal litter, grains of porous calcium hydrosilicate in the form of foamed or aerated concrete, said grains having a size between 0.5 mm and 10 mm.

2. The improvement of claim 1 wherein said calcium hydrosilicate is combined with 5–15% by weight gypsum.

* * * * *